United States Patent [19]
Davis

[11] 3,856,354
[45] Dec. 24, 1974

[54] SUGAR CANE WAGON AND THE LIKE

[76] Inventor: Darryl B. Davis, 624 W. St. Peter St., New Iberia, La. 70560

[22] Filed: Mar. 13, 1972

[21] Appl. No.: 234,268

[52] U.S. Cl.............. 298/10, 214/44 B, 280/490, 280/492, 298/11, 298/24
[51] Int. Cl............................................ B65g 67/50
[58] Field of Search ............... 298/24, 10, 11, 18; 214/44 B; 280/490, 492, 493, 494; 301/132, 301/125

[56] References Cited
UNITED STATES PATENTS

| | | | |
|---|---|---|---|
| 1,293,239 | 2/1919 | Strauss | 298/11 |
| 1,706,099 | 3/1929 | Benbow | 298/24 |
| 1,899,347 | 2/1933 | Mogford | 301/132 |
| 2,072,198 | 3/1937 | Davis | 301/125 |
| 2,072,787 | 3/1937 | Anderson | 298/24 X |
| 2,936,913 | 5/1960 | Watt | 214/44 B |
| 3,655,221 | 4/1972 | Warner | 280/490 |
| 3,664,686 | 5/1972 | Anderson | 280/490 R |

FOREIGN PATENTS OR APPLICATIONS

| | | | |
|---|---|---|---|
| 594,646 | 3/1960 | Canada | 280/490 R |

Primary Examiner—Robert S. Ward, Jr.
Assistant Examiner—Reinhard J. Eisenzopf
Attorney, Agent, or Firm—Edmund F. Bard

[57] ABSTRACT

A four-wheeled cart or wagon is provided for carrying 10 tons or more of cut sugar cane or the like, and which is adapted to be towed both over soft terrain and at moderate speeds on paved roads and highways. The rectangular frame of the cart is provided with lattice-like outwardly tilted sidewalls, a drawbar and special hitch assembly adapted to mate with a variety of different prime movers, and two axle and wheel assemblies fixedly attached to the frame in close spacing on opposite sides of a predetermined lateral pivot axis offset to the rear of the frame a preselected distance.

12 Claims, 7 Drawing Figures

PATENTED DEC 24 1974 3,856,354

SUGAR CANE WAGON AND THE LIKE

BACKGROUND OF INVENTION

This invention relates to methods and apparatus for transporting harvested agricultural products and, more particularly, relates to methods and apparatus for transporting sugar cane and the like.

It is well known that sugar cane is raised and harvested for use in producing sugar, but what is not well known outside of the industry is that once the cane has ripened it must be promptly harvested and delivered to the sugar mill to prevent loss arising from spoilage. Cutting techniques and equipment have been greatly improved in recent years, and methods and apparatus are now widely available which can completely cut an entire crop of cane in a large area in a relatively short period of time. No such improvement has been made, however, in methods and apparatus for removing the cane from the cane field and for transporting to the sugar mill until the advent of the present invention.

When cane is harvested in the conventional manner, the cut cane is deposited in a two-wheeled, single-axle cart or wagon, which is preferably towed by a conventional farm tractor and which is usually provided with open framework sides. It is important that the cane be laid or stacked in the wagon in a lengthwise manner, since crushed or broken cane tends to leak syrup which can be a source of rot or other contamination if the cane must be stored for a period before it is transported to the mill. Also, if the cane is stacked in the wagon in this manner, the wagon can carry a greater load than when the cane is tossed in in a random helter-skelter manner.

Since time is of the essence in removing the cane from the field after it has been cut, it is imperative to load each can wagon to its capacity and to use cane wagons of a maximum size. It should be appreciated, however, that most sugar cane is grown in semi-tropical regions which are subject to relatively high rainfall averages. Moreover, the ripening period for sugar cane tends to coincide with the beginning of what may be fairly termed the "rainy season" in most of these regions, and for these and other reasons the fields are usually quite soft and muddy at the time the cane is sought to be harvested. It is never easy to move any type of loaded vehicle across any plowed area, but when the ground is soaked by rain the task becomes especially difficult.

For this reason, it is conventional to employ two-wheeled carts or wagons to transport cut cugar cane out of the cane fields and to tow these carts with tractors which are especially designed to move through areas in which conventional trucks would become immovably mired. Although this type of transport has been successfully used for this purpose for many years, it is nevertheless subject to certain limitations which have become increasingly apparent with the improvement in harvesting techniques.

A first limitation arises from the fact that a two-wheeled cart which is adapted to be used in the cane fields cannot be moved over a road or highway at anything more than an extremely slow speed of about 5–10 miles per hour. Any vehicle traveling on a public thoroughfare at such a speed is obviously a traffic hazard, as well as a public nuisance. Thus, it has been necessary to transfer the cane out of these carts and into a conventional truck once the carts reach hard ground and to use only the trucks on the highway.

It will be apparent that this procedure is also subject to disadvantages. In the first place, the necessity for transferring the cane to the trucks tends to increase the loss factor which is always present whenever any agricultural product must be handled prior to utilization. Second, such a procedure requires the cane farmer to either rent or purchase twice the transportation equipment which would be required if the cane could be transported directly from the field to the sugar mill and also to employ extra labor for this purpose. Third, the cane farmer is also required to rent or purchase a crane or other lifting equipment solely for the purpose of transferring the cane from the carts to the trucks and to employ additional labor merely to operate the crane.

A second limitation to which the two-wheeled carts or wagons are subject arises from the fact that they cannot carry a load of cane of more than about 5 tons without becoming irretrievably mired axle-deep or deeper in the cane fields, and whenever this happens it is almost always necessary to stop the harvesting operation completely, unload all or part of the cane from the wagon, and then dig out the wagon at the cost of considerable labor. Originally, two or three tractor-towed wagons of this type moving continually in and out of the cane field, and to and from the harvesting crew and the truck-loading point, could fairly well handle all of the cane being harvested. Modern harvesting methods and apparatus are now too fast for this sort of removal technique, and thus the cane often lies cut in the fields for an unreasonable interval before it can be collected and removed. If a rain occurs before the cane has been collected, the cane lying cut in the field will tend to be ruined.

This limitation has sought to be overcome by employing additional tractors and carts, but this in turn requires an increase in the number and size of the trucks which must be used to transport the cane to the sugar mill. Also, more tractors moving in and out of the field behind the harvester tend to interfere with each other and are a disadvantage for this reason alone.

Since the conventional two-wheeled carts or wagons have a limited capacity, it has been sought to connect two or more such carts in tandem and to tow them in and out of the cane field by a single tractor. This technique is an improvement over the use of a single cart, of course, and is now widely used. However, it should also be noted that a train of two or more such carts is more difficult to handle in the cane field. The best way to keep a cart from becoming mired is to keep it continuously moving. Accordingly, with a tandem arrangement if one cart becomes stuck, it usually results in both carts in the train becoming immovably mired. Furthermore, if it is difficult to tow a single two-wheeled cane cart along a highway, it is practically impossible to tow a train of two such carts without at least one of them whipping to an extent that it breaks loose and overturns.

These disadvantages of the prior art are overcome with the present invention, and novel transporting methods and means are provided for more rapidly and safely moving cut sugar cane directly from the cane fields to the sugar mill.

SUMMARY OF INVENTION

In an ideal embodiment of the present invention, a two-axle, four-wheeled cart or wagon is provided which can carry loads of cane weighing as much as 10 tons or more without becoming bogged down in terrain which would be completely impassable for conventional two-wheeled carts with half such a load, which can be more easily towed in tandem on the highway as well as in a cane field, and which can be drawn on the highway at speeds of 20–30 miles per hour without risk of damage. Furthermore, such a cart is preferably provided with unloading means adapted to be used by the type of unloading equipment conventionally employed at sugar mills, and a special hitching whereby the cart can be mated with a variety of different towing equipment is provided.

In particular, a cart is provided which has four outwardly sloping sides for accommodating a maximum load of cut cane stalks with a minimum amount of bruising or other breakage. It is well known that individual stalks of sugar cane do not attain a uniform height, and since the cut stalks are preferably stacked longitudinally in the cart to avoid unnecessary damage, such a cart should preferably be approximately 20 feet long in order to accommodate stalks of extra length. Also, the forward and rearward walls or sides of the cart are preferably solid to prevent any of the stalks from sliding out of the cart when it is started or stopped. The side walls are preferably formed in the manner of a cage, however, to provide ventilation.

In a cart embodying the concept of the present invention, the bed of the cart may be mounted and supported on a pair of axles of suitable size and configuration, which are preferably located equidistantly of the ends of the cart and which are also spaced apart of each other a distance sufficient to accommodate wheels with high-speed bearings and 13.6-inch by 28-inch, 10-ply pneumatic tires having tractor-type tread. More particularly, in a cart having a bed 20 feet long, the forward axle is preferably located approximately 16 feet, 9 inches to the rear of the front edge of the bed, and the rearward axle is preferably located approximately 4 feet, 11 inches to the rear of the forward axle, such distances being measured relative to the center of each axle. Thus, the four wheels will be grouped slightly to the rear of the bed of the cart, which greatly facilitates movement of the cart through or over unstable terrain.

A cart of the type herein contemplated is preferably also provided with means by which the cart may be emptied in a minimum length of time. Accordingly, a plurality of lines or cables are preferably attached fixedly in a spaced-apart manner along the top rail of one of its cagelike sides, and are draped down the side and across the bed, and draped up the other side to a bar which is adapted to be removably rest along the upper edge of the opposite cagelike side wall of the cart. When cane stalks are loaded into the cart they will lie on these cables, and when the cart reaches the sugar mill the cart may be instantly unloaded by merely lifting the bar high enough to cause the cables to rise and dump out the cane. Accordingly, the bar is preferably provided with hooks so as to facilitate re-mounting the bar along the upper edge of the aforementioned opposite side wall.

These and other features and advantages of the present invention will become apparent from the following detailed description, wherein reference is made to the figures in the accompanying drawings.

IN THE DRAWINGS

FIG. 3 is a detailed top view of a hitch assembly suitable for use with a cane cart of the type depicted in FIGS. 1 and 2.

FIG. 4 is a detailed side view, partly in cross section, of the hitch assembly depicted in FIG. 3.

FIG. 5 is a detailed end view, partly in cross section, of the hitch assembly depicted in FIGS. 3 and 4.

DETAILED DESCRIPTION

Figure 1:
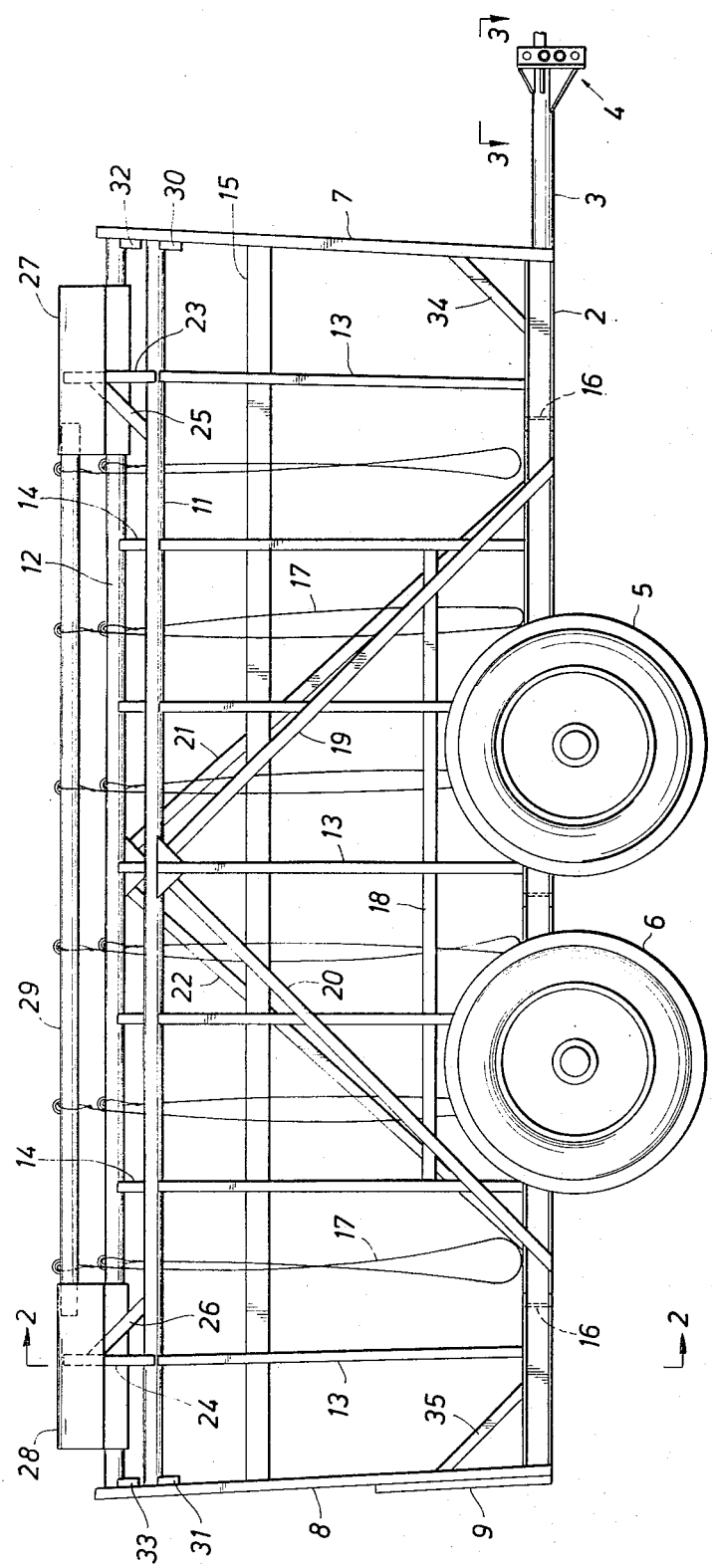
FIG. 1 is a simplified pictorial side view of an exemplary form of cane cart embodying the concepts of the present invention.

Referring now to FIG. 1, there may be seen a pictorial side view of a cart which is suitable for hauling cut sugar cane or the like according to the concept of the present invention. More particularly, the cart may be constructed with a rectangular frame portion composed of a pair of spaced-apart longitudinal struts 2 which are laterally connected by a plurality of spaced-apart cross struts 16 and which are suitably mounted on axles with forward and rear pairs of wheels 5 and 6. A drawbar 3 and special hitch assembly 4 is preferably mounted at one end of the frame, which is also preferably provided with outwardly sloping end walls 7 and 8 (preferably solid) and outwardly sloping lattice-type side walls.

As also indicated in FIG. 1, the side wall farthest from the view is preferably higher than the near side wall and is composed of a top rail 12 resting on a pair of mounting blocks 32 and 33 which, in turn, are welded or otherwise appropriately fixed to the inside surfaces of the end walls 7 and 8. The far wall further includes a plurality of spaced-apart vertical struts 14 interconnecting the top rail 12 and the far longitudinal frame strut 2, a pair of angularly arranged cantilever struts 21 and 22, and an inside reinforcing strut extending between the end walls 7 and 8 and coupling together each of the vertical struts 14. The near wall may be seen to be composed of a top rail 11 which is similarly mounted on a pair of blocks 30 and 31 fixed to the inside surfaces of the end walls 7 and 8, respectively, a plurality of spaced-apart vertical struts 13 interconnecting the end rail 11 and the near longitudinal strut 2 of the frame, and a reinforcing strut 18 coupling together the vertical struts 13 adjacent the wheels 5 and 6 as depicted in FIG. 1. As further illustrated, angular corner braces 34 and 35 may also be included for strengthening the end walls 7 and 8 relative to the near side wall, and a similar pair of corner braces not specifically depicted in FIG. 1 may also be included in the far side wall.

Referring again to FIG. 1, the near side wall may be provided with a pair of upwardly thrust hook supports 23 mounted on the top rail 11 immediately above the two vertical struts 13 adjacent the end walls 7 and 8. Accordingly, these hook supports 23 and 24 are preferably braced by suitable means such as angle braces 25 and 26, respectively. A suitable bumper pad or member 9 may be mounted on the exterior surface of the rear end wall 8 adjacent the frame.

As indicated in FIG. 1, the two longitudinal struts 2 are preferably formed of steel channel beams having their flanges turned outwardly of the cart. It should be noted that the struts 2 are vertically positioned, whereas the side walls slope outwardly of the frame. Thus, the two cantilever braces 19 and 20 in the near wall may be conveniently seated on the lower flange of the near longitudinal strut 2 to provide for maximum strength, and the cantilever struts 21 and 22 in the far lattice wall may be similarly braced or seated on the lower flange of the opposite longitudinal strut in the far side wall.

The cane being cut by the harvesting apparatus is preferably laid lengthwise in the cart on top of the lateral struts 16 composing the frame of the cart. In the cart depicted in FIG. 1, however, a plurality of flexible chains or cables 17 are preferably draped in the cart for the dual purpose of carrying the cane and for providing means for emptying the cart of its contents, as will hereinafter be explained. More particularly, each of the cables 17 may be seen to be connected at one end to the top rail 12 of the far side wall at spaced-apart locations therealong and at the other end at similar locations to a rail or cable hanger 29 mounted along the near side wall for the purpose of supporting the cane loaded into the cart.

Figure 7:
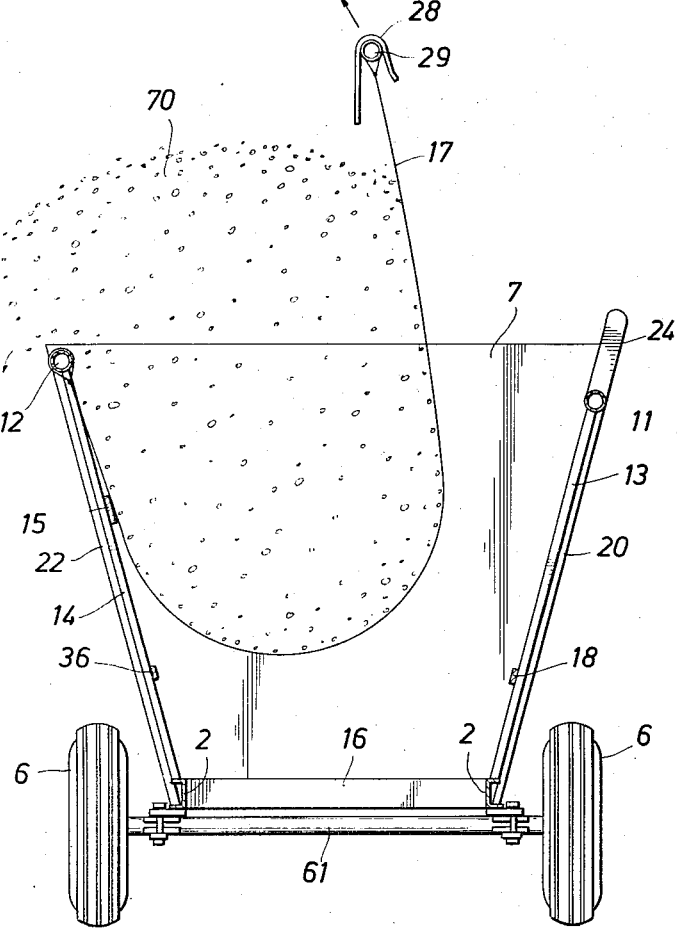
FIG. 7 is a simplified pictorial representation similar to that of FIG. 2 but also showing the manner and means by which a cane cart of the subject type may be expeditiously emptied when it reaches the sugar mill.

As may be seen in FIG. 7, the cable hanger 29 may be lifted off of the near side wall, and thus flap-type catches or hooks 27 and 28 are preferably mounted on opposite ends of the hanger 29 which are adapted to engage the upper ends of the hook supports 23 and 24. Accordingly, when the loaded cane cart reaches the sugar mill, the cable hanger 29 may be lifted off of the supports 23 and 24 by conventional means (not depicted), to raise the cable from within the cart, and and to thereby dump the cane over the top rail 12 of the far side wall and onto the ground or other receiving means (not depicted). After the cart has been unloaded, the cable hanger 29 may be dropped back on top of the near side wall, and the cart may then be returned to the cane field for reloading. Since the hooks 27 and 28 easily engage the hook supports 23 and 24, the time required to unload the cart and reorder it for highway travel is reduced to a minimum amount of time.

Figure 2:
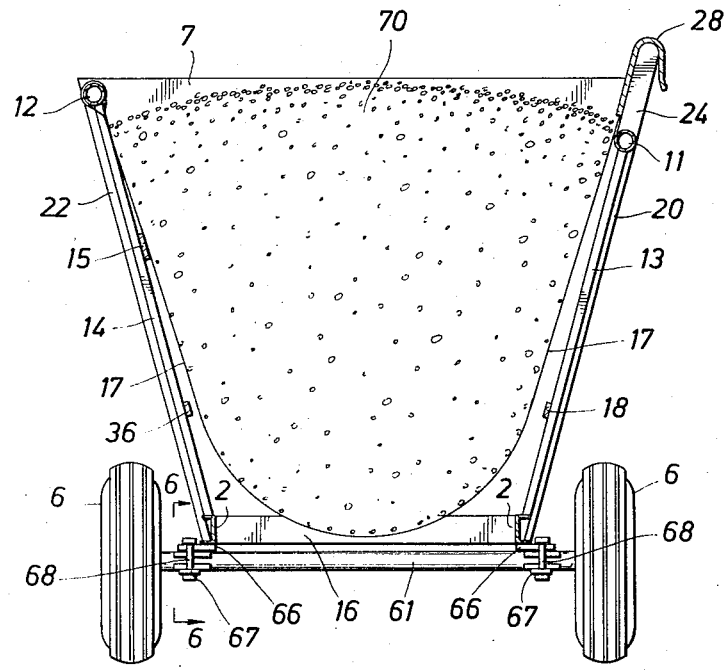
FIG. 2 is a simplified pictorial end view of the cane cart depicted in FIG. 1.

Referring now to FIG. 2, there may be seen a pictorial end view (partly in cross section) of the cane cart illustrated in FIG. 1. More particularly, there is illustrated in FIG. 2 both the near and far longitudinal struts 2 which are interconnected by lateral struts 16. The vertical struts 13 and 14 of the side walls may be seen to be seated on the top of the longitudinal struts 2, but the cantilever struts 20 and 22 are seated on the lower outwardly directed flange of each of the two struts 2, as previously explained. In addition, struts 13 and 14 may be seen to rise from the near longitudinal strut 2 to carry the top rail 11, and struts 14 may be seen to rise from the far longitudinal frame strut 2 to carry the top rail 12. Also, it should be noted that the top rail 12 of the far side wall reaches a higher elevation than does the top rail 11 of the near side wall. This is so that the lifter (not depicted) which unloads the cart can reach under the cable hanger 29 without engaging the top rail.

The aforementioned lateral strut 18 may be seen on the inside of the near side wall formed of the struts 13, and a similar lateral strut 36 may be seen located opposite of strut 18 on the inside of the far side wall. The main lateral brace or strut 15 on the far side wall is similarly mounted across the inside surfaces of the struts 14 adjacent the cables 17.

Referring again to FIG. 2, the rearward pair of wheels 6 may be seen to be provided with pneumatic tires of the type hereinbefore described and may further be seen to be mounted at opposite ends of a tubular axle 61 by high-speed hub and bearing assemblies (not depicted) of a conventional design suitable for travel over extended distances at speeds of 25–30 mph or greater. The forward pair of wheels 5 are mounted in a similar manner on a similar axle, of course.

It should be especially noted that the carts of the type depicted herein are expected to carry loads of 10 tons or more. Although fully loaded carts of this type will usually traverse the muddiest of cane fields without significant difficulty, it will occasionally happen that even a cart of this design will tend to become mired in the earth. When this happens, the axles are subject to special stress if the cart is sought to be dragged free of an especially soft spot in the field, and occasionally this will bend or even break one or both of its axles. It will be readily apparent that replacement of an axle is ordinarily a difficult and tedious task, but in the cart embodying the features of the present invention, provision is made for easy and quick replacement of a broken or otherwise defective axle.

Figure 6:
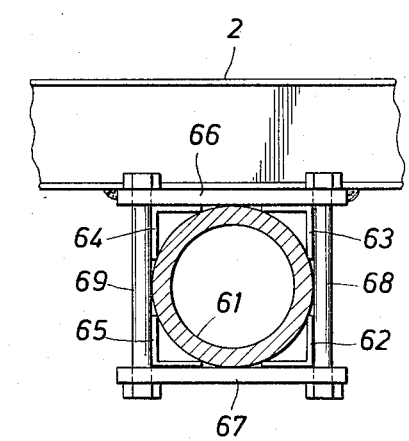
FIG. 6 is a detailed end view, partly in cross section, of the axle assembly of the type preferably used in a cart of the type depicted in FIGS. 1 and 2.

Referring now to FIG. 6, there may be seen a pictorial representation of the details of a mounting assembly especially suitable for attaching the tubular axle 61 with the longitudinal struts 2 of the frame of the cart. More particularly, there may be seen a mounting assembly located at each end of the axle 61 and which is composed of upper and lower steel plates 66 and 67 interconnected by a pair of axle bolts 68 and 69. Since the enclosure formed by the plates 66 and 67 and bolts 68 and 69 is rectangular in configuration, four separate corner members 62–65 are arranged between the plates 68 and 69 and located about the circumference of the axle 61 in order to resist rotation of the axle 61 between the plates 66 and 67. Removal of the axle 65 may be quickly and easily accomplished by merely removing the bolts 68 and 69 and the lower plate 67, since the upper corner members 63 and 64 are preferably fastened to the upper plate 66, and the lower corner members 62 and 65 are preferably fastened to the lower plate 67.

Referring now to FIGS. 3–5, there may be seen a detailed representation of a hitch assembly 4 suitable for present purposes and comprised of a pair of steel angle members 40 and 41 vertically mounted in a side-by-side manner on the end of the drawbar 3. As particularly indicated in FIG. 3, the end of the drawbar 3 is provided with a vertical recess or slot 45, and the two angle members 40 and 41 are preferably located so as to provide an extension of the vertical walls of the recess 45 outwardly from the end of the drawbar 3. The angle members 40 and 41 may be secured to the end of the drawbar 3 by any suitable means. However, since they are especially subject to heavy draft forces, they are preferably braced by triangular gussets 42 and 43 welded to the sides of the drawbar 3.

The recess 45 is preferably of a width suitable for slidably accommodating a link member 46 having an upper bushing portion or end 47 and having a pair of spaced-apart, downwardly extending tails or lock portions 48 and 49 each provided with two or more suitably spaced-apart bolt holes. As indicated in FIG. 4, these lock portions 48 and 49 also contain a pair of spacer sleeves 50 and 51 which are located between corresponding slidably accommodating lock bolts 52 and 53. The forwardly extending portions of the angle members 40 and 41 are similarly provided preferably with at least four vertically spaced-apart bolt holes 54 for mating with the two bolt holes located in each of the downwardly extending lock portions 48 and 49 of the link member 46. Accordingly, when the link member 46 is properly positioned in the recess 45, the bolt holes in the downwardly extending lock portions 48 and 49 of the link member 46 will mate with a selected pair of the bolt holes 54 in each of the two angle members 40 and 41, depending upon the height sought to be provided for the link member 46, and thus the link member 46 will be secured between the angle members 40 and 41 by the lock bolts 52 and 53.

Referring again to FIGS. 3-5, the hitch assembly 4 may also include a suitable clevis bolt 55 having its threaded end inserted through the bushing portion 47 of the link member 46 in the direction of the cart and having its clevis portion or end extending forwardly of the cart and the drawbar 3. A suitable lock nut 56 may be mounted on the threaded end of the clevis bolt 55 to secure it to the link member 46. As may also be seen in FIG. 4, the recess 45 is preferably sufficiently deep so as to accommodate the nut 56 as well as the protruding portion of the threaded end of the clevis bolt 55.

Referring again to FIGS. 3 and 4, it may be seen that the spaced-apart extensions of the clevis portion of the clevis bolt 55 are also provided with a pair of matching holes. Accordingly, a cylindrical coupling member 57 having a suitable bolt hole at one end horizontally across its width, and a similar bolt hole 60 perpendicularly at the other end, is preferably inserted in the clevis bolt 55 so that its horizontal hole mates with the holes in the clevis bolt 55. A pin or bolt 59 extending through the horizontal hole in the coupling member 57 and the holes in the clevis bolt 55 may be used to secure the coupling member 57 to the clevis bolt 55. The hole 60 in the opposite end of the coupling member 57 will provide suitable means for similar interconnection with the tractor or other prime mover (not depicted) sought to be used to tow the cane cart in and out of the cane fields.

As hereinbefore mentioned, the angle members 40 and 41 attached to the end of the drawbar 3 are preferably provided with four equally spaced-apart holes 54, whereas the lock portions 48 and 49 of the link member 46 are each provided with only two bolt holes. The holes 54 in the link member 46 will, of course, match any of the holes in the angle members 40 and 41, and thus the link member 46 may be positioned in any of a plurality of three possible elevations to provide for suitable mating of the hitch assembly 4 with the corresponding portion of the tractor. It should also be noted, however, that the link member 46 may also be inverted in the recess 45, whereby the bushing portion 47 of the link member 46 is positioned underneath, and the lock member portions 48 and 49 will extend upwardly between the vertical angle members 40 and 41. Thus, the user of the cane cart will be provided with three additional different possible elevations of the coupling member 57, whereby the hitch assembly 4 will mate with a considerable variety of different tractors or prime movers.

As hereinbefore stated, a cart or wagon of this type has a frame which is preferably about 20 feet long or greater. The exact location of the axles will be a function of the length of the frame as well as the size of the tires on the wheels 5 and 6. Regardless of whatever wheel size and frame length may be selected, however, it should be noted that the two axles are spaced relatively close together to position the load substantially at or about a single lateral pivot axis on the frame of the cart. Furthermore, it should also be noted that for purposes of enabling a fully loaded cart of this type to effectively traverse soft terrain of the type hereinbefore described, this pivot axis is located slightly rearwardly of the midpoint of the frame, rather than at the midpoint as is conventional with towable vehicles of this type.

The ideal location of the pivot axis is a function of how much sugar cane is loaded into the cart. Since the axles are preferably fixed to the frame in a cart embodying the concept of the present invention, however, it is preferable to position the axles with respect to a maximum load. Accordingly, it has been determined that the pivot axis is preferably spaced from the forward end of the frame a distance approximately equal to 11/20ths of the canebearing length of the frame. The two axles will then preferably be spaced an equal distance on opposite sides of this pivot axis, and will further preferably be spaced apart a distance substantially equal to one-fourth of the cane-bearing length of the frame.

The two lattice-type walls of the cart are, as illustrated in FIG. 2, each tilted outwardly of the frame at an angle of about 15°-16°. The two end walls 7 and 8 may also be outwardly tilted at approximately the same angle, or they may be positioned on the frame in a vertical or erect manner.

The drawbar 3 is preferably positioned equidistantly between the two side members or longitudinal struts 2 of the frame and may be fixedly secured by any suitable means to the end cross member or lateral frame strut 16 which connects the forward ends of the longitudinal struts 2 and which supports the forward end wall 7 of the cart or wagon. It should be noted that the drawbar 3 is the recipient of a draft impact of substantial magnitude, however, which is particularly great if the cart is sought to be moved from a position of immobility. Accordingly, in a preferred embodiment of the invention the drawbar 3 preferably extends a considerable distance into or under the frame towards the axles, and thus it is preferably secured either through or to a plurality of the various lateral struts 16 of the frame.

Although the two end walls 7 and 8 are preferably solid to prevent any of the cane from sliding longitudinally out of the cart, it should be noted that a full load of sugar cane is quite heavy and that this weight will tend to keep the cane in the cart. In an alternative embodiment of the invention, therefore, the end walls 7 and 8 may be provided with a lattice-type configuration the same as the side walls of the cart.

Various other modifications and alternatives will be apparent which will be within the scope of the present invention. Accordingly, it should be clearly understood that the methods and structures hereinbefore described and illustrated in the accompanying drawings are exemplary only and are not intended as limitations on the scope of the invention.

What is claimed is:

1. A wagon-like vehicle capable of traversing soft terrain while carrying at least 10 tons of cut sugar cane or the like and adapted for movement by a prime mover, comprising a rectangualr frame assembly composed of a pair of steel side beams rigidly interconnected together in a parallel spaced-apart manner by a plurality of spaced-apart steel cross beams and having a lateral pivot axis spaced rearwardly of the forward end of said frame assembly a distance substantially equal to 11/20ths of the length of said frame assembly, a forward end wall assembly mounted on the forward end of said frame assembly, a rearward end wall assembly mounted on the rearward end of said frame assembly, a first open lattice-like side wall assembly mounted between said end wall assemblies along one side of said frame assembly and outwardly tilted therefrom, a second open lattice-like side wall assembly mounted between said end wall assemblies along the opposite side of said frame assembly and outwardly tilted therefrom, said second side wall assembly having a height greater than the height of said first side wall assembly, a forward axle assembly fixedly mounted laterally across said frame assembly at a location spaced rearwardly from the forward end of said frame assembly a distance substantially equal to 8/20ths of the length of said frame assembly, a rear axle assembly fixedly mounted laterally across said frame assembly at a location spaced from said forward axle assembly a distance substantially equal to one-fourth of the length of said frame assembly, a pair of hanger mount members mounted on the upper edge of said first side wall assembly adjacent said end wall assemblies and raised to a height greater than that of said second side wall assembly, a cable hanger member adapted to rest on said hanger mount members, a plurality of flexible carrying lines interconnected between said cable hanger member and the upper edge of said second sidewall assembly and draped against the inside surfaces of said sidewall assemblies and across said frame assembly at spaced-apart locations therealong, a drawbar extending forwardly of the forward end of said frame assembly and having a vertical recess in its forward end, a first angle member vertically located on the end of said drawbar at one side of said recess and having one side provided with a plurality of bolt holes and arranged to form a forward extension of said side of said recess, a second angle member vertically located on the end of said drawbar at the other side of said recess and having one side provided with the same plurality of bolt holes and arranged to form a forward extension of said other side of said recess, a link member having a cylindrical bushing-like portion at one end which is insertable in said recess and between angle members and further having spaced apart parallel extensions having a plurality of bolt holes matching selected ones of said bolt holes in said angle members, a plurality of spacing sleeves located between said link member extensions and connecting said bolt holes therein, a plurality of bolts adapted to be inserted through said bolt holes in said linking means and said angle members and through said spacing sleeves for securing said link member to said drawbar, coupling means having provision at one end for interconnection with said prime mover, and connector means for interconnecting said coupling means and said bushing-like portion of said link member.

2. The hitching means described in claim 1, wherein connector means further includes clevis bolt means having a threaded bolt-like portion at one end insertable through said bushing-like portion of said link member and into said recess in said drawbar and having a clevis-like portion at the other end with provision for laterally receiving a pivot pin or the like, and nut means slidably movable in a vertical direction in said recess and threadably connectable with the threaded bolt-like portion of said clevis bolt means.

3. The hitching means described in claim 2, wherein said angle members are provided with a greater plurality of bolt holes than said plurality of bolt holes in said parallel extensions of said link member.

4. The hitching means described in claim 3, wherein said link member is adapted to be slidably positioned in said recess and between said angle members with its bushing-like portion in an upward direction and its extensions downwardly directed between said angle members.

5. The hitching means described in claim 4, wherein said link member is adapted to be slidably positioned in said recess and between said angle members with its bushing-like portion in a downward direction and its extensions in an upwardly thrust position between said angle members.

6. The hitching assembly means described in claim 5, wherein said coupling means further includes a cylindrical bolt-like member having a first hole vertically and diametrically through one end and a second hole horizontally and diametrically through its other end, and retainer pin means insertable through said second hole for pivotally interconnecting said other end of said cylindrical bolt-like member and said clevis portion of said clevis bolt means.

7. In a wagon-like vehicle capable of traversing soft terrain while carrying at least 10 tons of cut sugar cane or the like and adapted for movement by a prime mover, the vehicle further having a drawbar extending forwardly of the forward end of said frame assembly with a vertical recess in the forward end, an improved hitching means comprising,
- a first angle member vertically located on the end of said drawbar at one side of said recess and having one side provided with a plurality of bolt holes and arranged to form a forward extension of said side of said recess,
- a second angle member vertically located on the end of said drawbar at the other side of said recess and having one side provided with the same plurality of bolt holes and arranged to form a forward extension of said other side of said recess,
- a link member having a cylindrical bushing-like portion at one end which is insertable in said recess and between angle members and further having spaced apart parallel extensions having a plurality of bolt holes matching selected ones of said bolt holes in said angle members,
- a plurality of spacing sleeves located between said link member extensions and connecting said bolt holes therein,
- a plurality of bolts adapted to be inserted through said bolt holes in said linking means and said angle members and through said spacing sleeves for securing said link member to said drawbar,
- coupling means having provision at one end for interconnection with said prime mover, and
- connector means for interconnecting said coupling means and said bushing-like portion of said link member.

8. The hitching means described in claim 7, wherein said connector means further includes
- clevis bolt means having a threaded bolt-like portion at one end insertable through said bushing-like portion of said link member and into said recess in said drawbar and having a clevis-like portion at the other end with provision for laterally receiving a pivot pin or the like, and
- nut means slidably movable in a vertical direction in said recess and threadably connectable with the threaded bolt-like portion of said clevis bolt means.

9. The hitching means described in claim 8, wherein said angle members are provided with a greater plurality of bolt holes than said plurality of bolt holes in said parallel extensions of said link member.

10. The hitching means described in claim 9, wherein said link member is adapted to be slidably positioned in said recess and between said angle members with its bushing-like portion in an upward direction and its extensions downwardly directed between said angle members.

11. The hitching means described in claim 10, wherein said link member is adapted to be slidably positioned in said recess and between said angle members with its bushing-like portion in a downward direction and its extensions in an upwardly thrust position between said angle members.

12. The hitching means described in claim 11, wherein said coupling means further includes
- a cylindrical bolt-like member having a first hole vertically and diametrically through one end and a second hole horizontally and diametrically through its other end, and
- retainer pin means insertable through said second hole for pivotally interconnecting said other end of said cylindrical bolt-like member and said clevis portion of said clevis bolt means.

* * * * *